(12) United States Patent
Karppanen

(10) Patent No.: US 11,582,195 B1
(45) Date of Patent: Feb. 14, 2023

(54) PARALLEL ENCRYPTED DATA STREAMS FOR VIRTUAL PRIVATE NETWORKS

(71) Applicant: Amazon Technologies, Inc., Seattle, WA (US)

(72) Inventor: Jari Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/143,137

(22) Filed: Sep. 26, 2018

(51) Int. Cl.
*H04L 9/40* (2022.01)
*H04L 9/08* (2006.01)

(52) U.S. Cl.
CPC ........ *H04L 63/0272* (2013.01); *H04L 9/0891* (2013.01); *H04L 63/0457* (2013.01)

(58) Field of Classification Search
CPC ............ H04L 63/0272; H04L 63/0457; H04L 9/0891; H04L 61/2592; H04L 63/0428; H04L 9/3215
See application file for complete search history.

(56) References Cited

U.S. PATENT DOCUMENTS

| | | | | |
|---|---|---|---|---|
| 2004/0103279 A1* | 5/2004 | Alten | ............... | H04L 63/0428 713/160 |
| 2010/0217971 A1* | 8/2010 | Radhakrishnan | ... | H04L 63/0272 713/153 |
| 2015/0236819 A1* | 8/2015 | Zhovnirnovsky | ..... | H04L 1/1819 370/216 |
| 2017/0013296 A1* | 1/2017 | Millar | ................ | H04N 21/2362 |
| 2017/0171156 A1* | 6/2017 | Schultz | ..................... | H04L 9/00 |
| 2018/0041421 A1* | 2/2018 | Lapidous | ............... | H04L 69/14 |
| 2019/0103881 A1* | 4/2019 | Connor | .............. | H03M 13/091 |
| 2019/0173850 A1* | 6/2019 | Jain | ..................... | H04L 63/0428 |
| 2019/0372948 A1* | 12/2019 | Varghese | ............ | H04L 67/1027 |
| 2020/0076527 A1* | 3/2020 | Williams | ............... | H04L 63/18 |

OTHER PUBLICATIONS

RFC 2402 IP Authentication Header. S. Kent, R. Atkinson. Nov. 1998. [online][retrieved on Aug. 20, 2020], Retrieved from: https://tools.ietf.org/html/rfc2402 (Year: 1998).*
RFC 2409 Internet Key Exchange (IKE). D. Harkins, D. Carrel. Nov. 1998. [online][retrieved on Aug. 22, 2020], Retrieved from: https://tools.ietf.org/html/rfc2409 (Year: 1998).*
Dierks, T., et al., "The TLS Protocol Version 1.0," Request for Comments: 2246, Standards Track, Jan. 1999, 75 pages.
Newman, C., "Using TLS with IMAP, POP3 and ACAP," Request for Comments: 2595, Standards Track, Jun. 1999, 16 pages.

(Continued)

*Primary Examiner* — Philip J Chea
*Assistant Examiner* — Sangseok Park
(74) *Attorney, Agent, or Firm* — Davis Wright Tremaine LLP

(57) ABSTRACT

A virtual private network (VPN) server connected to a client device within a VPN obtains data for delivery to the client device. The VPN server selects a data stream from a set of data streams of the VPN connection with the client device, where each data stream of the set of data streams has a different encryption context. The VPN server generates a data packet based on the data such that the data packet is encrypted using the encryption context specific to the selected data stream. The VPN server transmits the data packets to the client device via the selected data stream.

20 Claims, 7 Drawing Sheets

(56) References Cited

OTHER PUBLICATIONS

Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request tor Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Tuexen, M., et al., "Datagram Transport Layer Security (DTLS) for Stream Control Transmission Protocol (SCTP)," Request for Comments: 6083, Standards Track, Jan. 2011, 10 pages.
Eastlake, D., "Transport Layer Security (TLS) Extensions: Extension Definitions," Request for Comments: 6066, Standards Track, Jan. 2011, 25 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

\* cited by examiner

PARALLEL ENCRYPTED DATA STREAMS FOR VIRTUAL PRIVATE NETWORKS

BACKGROUND

Virtual private networks (VPN) are utilized extensively to enable users to exchange data securely and anonymously over a public communications network, such as the Internet. For instance, information transmitted between a client device and a VPN server is encrypted and transmitted over an encrypted data stream within the VPN, thereby preventing any unauthorized users from being able to intercept the data being transmitted over the encrypted data stream, as it would not have the cryptographic key required to decrypt the data. However, reliance on a single encrypted data stream may increase the latency within the virtual private network.

BRIEF DESCRIPTION OF THE DRAWINGS

Various techniques will be described with reference to the drawings, in which.

DETAILED DESCRIPTION

Figure 1:
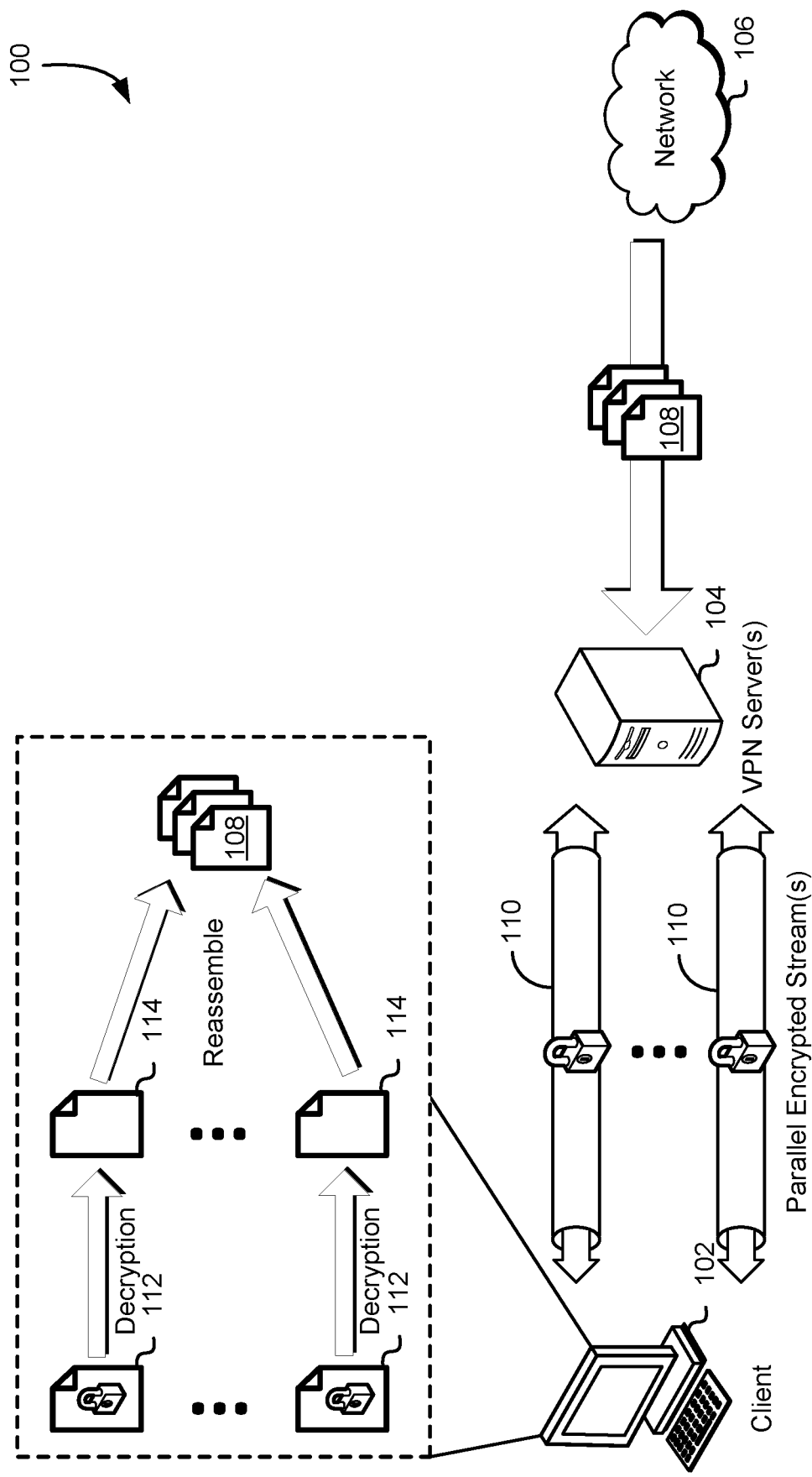
FIG. 1 shows an illustrative example of a system in which various embodiments can be implemented.

Techniques described and suggested herein relate to the parallelization of encrypted data streams for transmission of data from a VPN server to a client device. In an example, a VPN server receives data for distribution to a client device. The VPN server and the client device may function within a VPN, whereby communications between the VPN server and the client device is encrypted to prevent unauthorized access to data transmitted between the VPN server and the client device. In one example, the VPN server and the client device establish multiple encrypted data streams, whereby each encrypted data stream may utilize a separate encryption context (e.g., cryptographic keys, initialization vector, counter values, etc.). The encryption context, in an embodiment, is a set of parameters used as inputs to define how encryption and decryption is to occur. As an example, the encryption context may be a symmetric cryptographic key and/or an initialization vector. The VPN server may divide the data into multiple data packets that may be transmitted to the client device through the various encrypted data streams. The VPN server may encrypt each data packet in accordance with the encryption context of the data stream to be used to transmit the data packet. Further, the VPN server may generate a mapping array that specifies the sequence ordering for assembly of the data packets to obtain the data and identifiers corresponding to the encryption context for each data packet. These identifiers may be used by the client device to determine which encryption context is to be used to decrypt each data packet as it is obtained through the encrypted data streams.

In an example, the client device obtains the data packets corresponding to the data obtained by the VPN server in an order that is not necessarily the same order in which the data packets were transmitted to the VPN server and/or that is not necessarily the same order in which data in the data packets should be ordered to construct a data object from the data in the data packets. The client device may evaluate the mapping array and the sequence ordering specified therein to determine the ordering for assembly of the data packets to obtain the data from the VPN server. Further, the client device may evaluate the mapping array to identify the encryption context for any of the data packets obtained over the encrypted data streams. Based on the encryption context for each data packet obtained over the encrypted data streams, the client device may determine whether it has the requisite encryption context to decrypt the obtained data packets. If so, the client device may decrypt the obtained data packets and initiate ordering of the data packets in accordance with the sequence ordering specified in the mapping array. In an example, the VPN server transmits duplicate data packets over the encrypted data streams subject to a redundancy schema (e.g., M-out-of-N redundancy, N+1 redundancy, erasure coding of the data packets, etc.) in high data packet loss scenarios or in other scenarios whereby transmission of the data is of paramount importance. Thus, if any data packet transmitted by the VPN server to the client device over any of the encrypted data streams is lost, the client device may rely on the utilized redundancy schema to determine whether assembly of the obtained data packets is possible to obtain the data.

In an example, the encryption context for a particular encrypted data stream can be rotated or otherwise changed by the client device or the VPN server. For instance, the encryption context for a particular encrypted data stream may be rotated or changed in response to a triggering event (e.g., the encrypted data stream is changed from a secondary stream to a primary stream, another data stream is removed, etc.) or after a specified period of time has elapsed for use of the encryption context for the encrypted data stream. Rotation of an encryption context may comprise changing one or more parameters in the encryption context, such as by replacing a cryptographic key with another cryptographic key. The particular encrypted data stream may be deactivated such that no data packet streams are transmitted over this encrypted data stream during the rotation/change of the encryption context. In an example, the VPN server encrypts data packets using the encryption context of any of the other available encrypted data streams to enable continued transmission of these data packets to the client device. The VPN server may update the mapping array to indicate the encryption context for these data packets which are transmitted over the other encrypted data streams. In an example, once the encryption context has been rotated/changed for the encrypted data stream, the VPN server may encrypt new data packets using the new encryption context for this encrypted data stream and transmit data packets over this encrypted data stream. The mapping array may be updated to indicate use of this new encryption context for the encrypted data stream, thereby enabling the client device to utilize the new encryption context to decrypt the data packet obtained over this encrypted data stream.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because data is divided into various data packets that are distributed over multiple encrypted data streams, network latency may be reduced as there is no longer a reliance on a single data stream for transmission of the data packets. Further, because one or more redundancy schema may be used in generating the data packets, the impact of data packet loss may be reduced, as the client device may reconstruct the data using other obtained data packets. Additionally, since multiple encryption contexts may be used to encrypt the data packets for transmission over the various encrypted data streams of the VPN, idle central processing unit (CPU) time for multi-core CPUs may be used more efficiently by allowing burst encryption when the network bandwidth for the VPN is constrained. Higher throughput via the multiple encrypted data streams is also achieved when the CPU is constrained, as multiple data packets may be transmitted at once through the multiple encrypted data streams.

FIG. 1 shows an illustrative example of a system 100 in which various embodiments can be implemented. In the system 100, a VPN comprises various parallel encrypted data streams 110 through which data packets may be transmitted from a VPN server 104 to a client device 102, and vice versa, within the VPN. The client device 102, in some embodiments, is a mobile (e.g., portable) computing device (e.g., tablet computers, laptop computers, wearable computers, smartphones, handheld game consoles, portable media players, personal digital assistants, digital media players, etc.) or other computing device (e.g., desktop computers, servers, etc.). The VPN server 104 may be a remote access server that provides the client device 102 with access to the VPN over a public communications network, such as the Internet.

In an embodiment, the client device 102 and the VPN server 104 establish a set of parallel encrypted data streams 110 for transmission of data 108 between the user client 102 and the VPN server 104 over the set of parallel encrypted data streams 110. The client device 102 may establish a connection with the VPN server 104 over a communications network 106, such as the Internet. Once the connection with the VPN server 104 has been established, the client device 102 may establish the set of parallel encrypted data streams 110. Each of the parallel encrypted data streams 110 may be established subject to a VPN protocol (e.g., Point-to-Point Tunneling Protocol (PPTP), Layer Two Tunneling Protocol (L2TP), Internet Protocol Security (IPSec), etc.). Each of the data packets transmitted over any of the parallel encrypted data streams 110 may be constructed in accordance with the corresponding VPN protocol. Further, each data packet may be encapsulated via encryption of the data packet using an encryption context corresponding to the particular encrypted data stream 110 through which the data packet is transmitted.

In an embodiment, to establish each encrypted data stream 110, the client device 102 and the VPN server 104 perform a handshake. A handshake may be a process by which two computing entities negotiate parameters of a session and, in the example of FIG. 1, parameters of a session of an encrypted communications session. For instance, in some embodiments, the handshake is a secure socket layer (SSL) handshake or a transport layer security (TLS) handshake. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish a secure channel. Other protocols implemented below the application layer of the Open Systems Interconnect (OSI) model may also be used and/or adapted to utilize techniques described herein.

In an embodiment, the handshake is performed by the client device 102 and the VPN server 104 to negotiate an encryption context to be used in secure communications over a particular encrypted data stream 110. In some embodiments, the encryption context is a cryptographic key. For instance, the handshake may be used to negotiate a cryptographic key for use in encrypting and decrypting a data packet transmitted over the encrypted data stream 110. Negotiation of a cryptographic key is a process by which multiple computer systems securely and mutually determine a symmetric cryptographic key that can be used for encryption and decryption. Such negotiations often include use of asymmetric cryptography for the exchange of cryptographic material, such as one or more symmetric cryptographic keys or information from which one or more symmetric cryptographic keys can be derived.

In an embodiment, the client device 102 and the VPN server 104 utilize initialization vectors and/or counters along with a cryptographic key for encryption of a data packet. For instance, a client device 102 or VPN server 104 may utilize a data packet, a cryptographic key, and an initialization vector or counter as input to a hash function (e.g., HMAC, etc.) to generate an encrypted data packet. The encrypted data packet may be transmitted over an encrypted data stream 110 with a header that specifies the initialization vector or counter. Thus, a recipient of the encrypted data packet may utilize the cryptographic key and the initialization vector specified in the header to decrypt the encrypted data packet. The initialization vector or counter may be utilized once and may also be referred to as a "nonce." In an embodiment, for each encrypted data stream 110, the client device 102 and the VPN server 104 utilize a range of initialization vectors or counters that is distinct from other ranges of initialization vectors or counters utilized for other encrypted data streams 110. This may prevent use of the same initialization vector or counter among the various encrypted data streams 110 at any time.

The number of different encrypted data streams 110 created between the client device 102 and the VPN server 104 may be selected based on the number of CPU cores of each of the client device 102 and the VPN server 104. For instance, a parallel encrypted data stream 110 may correspond to a CPU core of either the client device 102 or the VPN server 104. The number of different encrypted data streams 110 may correspond to the minimum number of CPU cores of either the client device 102 or the VPN server 104. For instance, if the client device 102 includes a CPU that comprises four cores and the VPN server 104 includes a CPU that comprises eight cores, the VPN may include four distinct and parallel encrypted data streams 110 between the client device 102 and the VPN server 104. Alternatively, the number of different encrypted data streams 110 may correspond to the maximum number of CPU cores of either the client device 102 or the VPN server 104. As another example, the number of different encrypted data streams 110 may correspond to a number between the minimum number of CPU cores and the maximum number of CPU cores of either the client device 102 or the VPN server 104.

In an embodiment, the VPN server 104 obtains, from a public communications network 106, such as the Internet, data 108 that is to be provided to the client device 102. The VPN server 104, in response to obtaining the data 108 over the public communications network 106, determines a schema for dividing the data 108 into a set of data packets for delivery to the client device 102 over the myriad encrypted data streams 110 between the VPN server 104 and the client device 102. For instance, the VPN server 104 may determine the available network bandwidth for each encrypted data stream 110. Based on the available network bandwidth for each of the encrypted data streams 110, the VPN server 104 may determine how many data packets to generate from the data 108 and the encrypted data streams 110 that are to be used for each data packet. In an embodiment, the VPN server 104 creates a mapping array that may indicate, for each data packet, an identifier corresponding to the encrypted data stream 110 utilized to transmit the data packet to the client device 102, a sequence ordering for the data packets and the corresponding placement within the sequence for the data packet, the initialization vector or counter (if used) utilized to encrypt the data packet, an identifier corresponding to the cryptographic key utilized, and the like. The VPN server 104 may encrypt each data packet according to the encryption schema (e.g., cryptographic key, initialization vector, counter, etc.) for the encrypted data stream 110 to be used for transmittal of the data packet. Each data packet may be transmitted over an encrypted data stream 110 with a packet header that specifies the cryptographic key utilized to encrypt the data packet, any initialization vector or counter used in the encryption of the data packet, and the placement of the data packet within the ordering of data packets for reassembly of the data 108.

It should be noted that the process described above for transmitting data packets over the parallel encrypted data streams 110 may alternatively be performed by the client device 102. For instance, the client device 102 may transmit data 108, through the VPN server 104, to another entity over the public communications network 106. To that end, the client device 102 may divide the data 108 into a set of data packets for transmission to the VPN server 104 over the encrypted data streams 110. The client device 102 may encrypt each of the data packets in accordance with the encryption schema utilized for the encrypted data streams 110 to be utilized for each of the data packets and transmit the encrypted data packets to the VPN server 104 through use of the parallel encrypted data streams 110.

Returning to the example illustrated in FIG. 1, the client device 102 may obtain the encrypted data packets 112 from the VPN server 104 over the set of parallel encrypted data streams 110. The client device 102 may evaluate the mapping array and the sequence ordering specified therein to determine the ordering of the obtained encrypted data packets 112. Further, in an embodiment, the client device 102 evaluates the header for each encrypted data packet 112 to determine the method for decryption of the encrypted data packet 112. For instance, the client device 102 may evaluate the packet header for a particular encrypted data packet 112 to identify the cryptographic key and, if utilized, the initialization vector or counter utilized in conjunction with the cryptographic key to encrypt the data packet. The client device 102 may utilize the identified cryptographic key and initialization vector/counter (if used) to decrypt the encrypted data packet to obtain the unencrypted data packet 114.

In an embodiment, the client device 102 evaluates the mapping array and the obtained unencrypted data packets 114 to determine whether the client device 102 has obtained the requisite data packets for reassembly of the data 108. If the client device 102 has obtained the requisite data packets for reassembly of the data 108, the client device 102 may utilize the mapping array to determine the ordering of the data packets 114 to reassemble the data 108 obtained from through the public communications network 106. However, if the client device 102 determines that more data packets are required to reassemble the data 108, the client device 102 may determine whether these additional data packets are being transmitted by the VPN server 104 to the client device 102. For instance, the client device 102 may evaluate the mapping array to identify the missing data packets. The client device 102 may transmit a request to the VPN server 104 to transmit these missing data packets over the parallel encrypted data streams 110.

In an embodiment, the VPN server 104 utilizes a redundancy schema to provide a level of redundancy to the data packets transmitted over the parallel encrypted data streams 110. For example, the VPN server 104 may duplicate each of the data packets by transmitting these data packets over two or more parallel encrypted data streams 110. Thus, each redundant data packet may be encrypted using the cryptographic key and (if utilized) initialization vector/counter corresponding to the encrypted data stream 110 utilized. The client device 102 may obtain these redundant data packets and utilize the mapping array to identify any duplicative data packet as being a redundant copy of a data packet usable to reassemble the data 108. In an embodiment, the VPN server 104 utilizes M-out-of-N redundancy or other parallel redundancy for transmission of the data packets to the client device 102 over the parallel encrypted data streams 110. In an M-out-of-N redundancy scheme, at least M components out of a possible N parallel data packets of the data 108 are required by the client device 102 to reassemble the data 108. The determination of the number of data packets to generate, whereby a smaller number of data packets is required for reassembly of the data 108, may be performed based on rate of data packet loss over any of the encrypted data streams 110. Thus, the VPN server 104 may utilize a redundancy encoding scheme such as erasure coding to deconstruct the data 108 into multiple data packets that can be transmitted over the encrypted data streams 110.

In an embodiment, the data included in each encrypted data packet includes a portion of the payload data from the previously transmitted encrypted data packet and a portion of the payload data of the subsequent encrypted data packet to be transmitted to the client device 102. For example, a first encrypted data packet may include a portion of payload data that may be included in the second encrypted data packet transmitted to the client device 102. The second encrypted data packet may include a portion of payload data from the first encrypted data packet and a portion of payload data of a third encrypted data packet that is to be provided. This overlapping of portions of payload data may continue for all encrypted data packets generated for particular content. The client device 102 may utilize the sequence ordering for the encrypted data packets to identify any overlapping portions of payload data and determine whether there are any redundant portions of payload data from the collection of encrypted data packets. The client device 102 may discard any redundant portions of payload data. However, if any encrypted data packets are not received, the client device 102 may identify the overlapping portions of payload data necessary to reassemble the payload data and use these in the reassembly of the payload data.

In an embodiment, the encrypted data streams 110 are organized in a hierarchical manner such that there is a primary encrypted data stream for transmission of the primary data packet for the data 108 and a set of secondary encrypted data streams for transmission of other secondary data packets (e.g., smaller data packets, etc.). If the primary encrypted data stream is rendered inoperable (e.g., rate of data packet loss exceeds a threshold value, connectivity over the data stream is terminated, etc.) and/or the primary data packet is lost, the VPN server 104 may assign a secondary encrypted data stream to be the new primary encrypted data stream for data transmissions to the client device 102. Further, the VPN server 104 may initiate, with the client device 102, a new secondary encrypted data stream. The VPN server 104 may terminate or otherwise abandon the original primary encrypted data stream.

In an embodiment, each of the encrypted data streams 110 is subject to rotation of its underlying cryptographic key and (if utilized) range of initialization vector or counter values. For instance, a cryptographic key may be subject to rotation after a period of time has elapsed or in response to a triggering event (e.g., the cryptographic key is compromised, the cryptographic key is no longer available or is lost, etc.). Similarly, a new range of initialization vectors or counter values may be assigned if the current range of initialization vectors or counter values is exhausted. If the client device 102 or the VPN server 104 determines that rotation of a cryptographic key for a particular encrypted data stream 110 is required, the client device 102 or VPN server 104 may initiate a new handshake for the particular encrypted data stream 110.

During the new handshake process for this encrypted data stream 110, the VPN server 104 may redirect data packets to other encrypted data streams by utilizing other cryptographic keys corresponding to these other encrypted data streams to encrypt the data packets. Further, the VPN server 104 may update the mapping array to indicate that these data packets are being transmitted over the other encrypted data streams. Thus, the client device 102 may obtain the encrypted data packets 112 over the other encrypted data streams and utilize the corresponding cryptographic keys and (if utilized) initialization vectors or counters to decrypt the encrypted data packets 112 and order these data packets in accordance with the sequence ordinal for assembly of the data packets into the data 108.

If the VPN server 104 detects that rotation of the cryptographic key for an encrypted data stream has been completed, and the VPN server 104 and client device 102 have obtained the shared secret (e.g., cryptographic key, etc.) corresponding to the encrypted data stream, the VPN server 104 may resume transmission of a subset of the data packets using this encrypted data stream. The VPN server 104 may utilize the new cryptographic key and initialization vectors/counters corresponding to a new range of values assigned to the encrypted data stream to encrypt data packets to be transmitted over the encrypted data stream. Further, the VPN server 104 may update the mapping array and sequence ordering for the data packets to indicate which data packets are being transmitted over the encrypted data stream and the placement within the ordering of these data packets for reassembly of the data 108.

In an embodiment, the client device 102 transmits a request to the VPN server 104 to utilize a variety of encrypted data streams 110 for use in transmitting the data packets to the client device 102. By default, data packets between the client device 102 and the VPN server 104 may be transmitted over a primary encrypted data stream. However, the client device 102 may request that data packets for certain data be transmitted over multiple encrypted data streams instead of just the primary encrypted data stream. For instance, if the network bandwidth for the primary encrypted data stream is at or near capacity, the client device 102 may request use of other encrypted data streams for delivery of data packets.

In an embodiment, the client device 102 obtains data from the network 106, through the VPN server 104, that provides an indication that multiple encrypted data streams be utilized for transmission of data packets from the VPN server 104 to the client device 102. For instance, if a particular site accessible through the network 106 indicates that multiple encrypted data streams may be used to reduce the latency in obtaining data via the site, the client device 102 may transmit a request to the VPN server 104 to establish or otherwise use the multiple encrypted data streams for use in transmitting the data packets from the VPN server 104 to the client device 102.

In an embodiment, each encrypted data stream 110 has a corresponding queue maintained by the client 102 for processing of the encrypted data packets 112 obtained over the encrypted data stream 110. If the client 102 receives, via an encrypted data stream 110, an encrypted data packet 112 that does not correspond to the ordering of data packets for reassembly of the data 108, the client 102 may maintain the encrypted data packet 112 in the queue corresponding to the encrypted data stream 110. As more encrypted data packets 112 are received, the client 102 may evaluate each queue corresponding to each encrypted data stream 110 to obtain encrypted data packets 112 in accordance to the ordering specified in the mapping array or in the headers of each of the encrypted data packets 112. Thus, the queue for each encrypted data stream 110 may be reduced rapidly, as the out-of-sequence data packets are distributed among the various queues based on the encrypted data streams 110 utilized to transmit the encrypted data packets 112.

Figure 2:
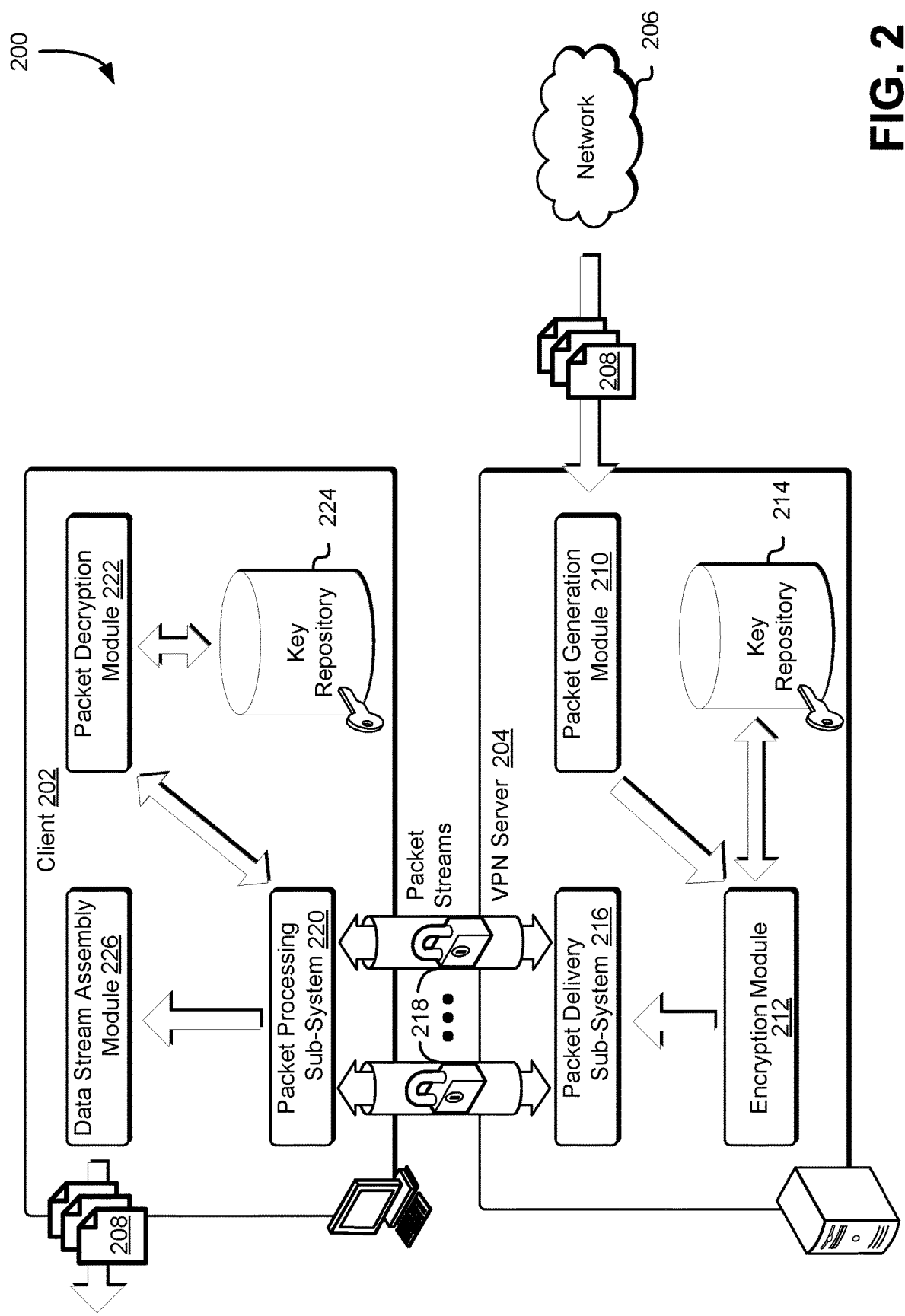
FIG. 2 shows an illustrative example of a system in which a VPN server transmits a set of data packets to a client using parallel encrypted data streams between the VPN server and the client in accordance with at least one embodiment.

FIG. 2 shows an illustrative example of a system 200 in which a VPN server 204 transmits a set of data packets to a client device 202 using parallel encrypted data streams 218 between the VPN server 204 and the client device 202 in accordance with at least one embodiment. In the system 200, a VPN server 204 receives data 208 from a public communications network 206 (e.g., Internet) for delivery to a client device 202 within a VPN environment. In response to receiving the data 208, the VPN server 204, through a packet generation module 210, may divide the data 208 into a set of data packets that may be transmitted over a parallel series of encrypted data streams 218 established between the client device 202 and the VPN server 204. The packet generation module 210 is implemented on the VPN server 204 using hardware and software and may be executed using executable instructions whose execution by the VPN server 204 causes the packet generation module 210 to perform the operations described herein.

In an embodiment, the packet generation module 210 utilizes a redundancy scheme to provide a level of redundancy to the data packets to be transmitted over the parallel encrypted data streams 218. The packet generation module 210 may use M-out-of-N redundancy or other parallel redundancy scheme for transmission of the data packets to the client device 202 over the parallel encrypted data streams 218. The determination of the number of data packets to generate, whereby a smaller number of data packets is required for reassembly of the data 208, may be performed based on a rate of data packet loss over any of the encrypted data streams 218. Thus, the packet generation module 210 may utilize a redundancy encoding scheme such as erasure coding to deconstruct the data 208 into multiple data packets that can be transmitted over the encrypted data streams 218.

The packet generation module 210 may generate a mapping array for the data 208 that indicates an original sequence ordinal corresponding to the order in which the data packets are to be assembled to obtain the data 208. Further, the mapping array may include a sequence sub-ordinal that indicates the data stream identifiers corresponding to the encrypted data streams 218 through which the data packets are being transmitted. This may enable a packet delivery sub-system 216 to transmit the data packets through the encrypted data streams 218 in an ordering different than that specified in the mapping array. The packet generation module 210 may provide the mapping array and the generated data packets to an encryption module 212 for encryption of each data packet using a cryptographic key corresponding to the encrypted data stream 218 to be used for transmission of the data packet. The encryption module 212 is implemented on the VPN server 204 using hardware and software and may be executed using executable instructions whose execution by the VPN server 204 causes the encryption module 212 to perform the operations described herein.

In an embodiment, the encryption module 212 queries, for each data packet to be transmitted to the client device 202, a key repository 214 to identify a cryptographic key usable to encrypt the data packet. For instance, the encryption module 212 may utilize an identifier corresponding to the encrypted data stream identifier specified in the mapping array for the data packet to identify, from the key repository 214, the cryptographic key utilized for communications via the encrypted data stream. Further, if the encrypted data stream relies on initialization vectors or counters, the encryption module 212 may determine the available values that may be used for encryption of the data packet to be transmitted over the encrypted data stream. The encryption module 212 may update the mapping array to specify, for each data packet, an identifier corresponding to the cryptographic key utilized to encrypt the data packet. Further, if the data packet is encrypted using an initialization vector or counter along with the cryptographic key, the encryption module 212 may specify, in the mapping array, the plaintext value of the initialization vector or counter. The encryption module 212 may utilize a data packet, a cryptographic key corresponding to the encrypted data stream to be utilized for transmission of the data packet, and (if utilized) an initialization vector/counter as input to a hash function to encrypt the data packet.

The encryption module 212 may transmit the encrypted data packets and the updated mapping array to a packet delivery sub-system 216 for transmission over the encrypted data streams 218 to the device client 202. The packet delivery sub-system 216 is implemented on the VPN server 204 using hardware and software and may be executed using executable instructions whose execution by the VPN server 204 causes the packet delivery sub-system 216 to perform the operations described herein. The packet delivery sub-system 216 may evaluate the mapping array to determine which encrypted data stream is to be utilized for delivery of each data packet to the client device 202. As noted above, the mapping array may specify, for each data packet, an identifier corresponding to the encrypted data stream to be utilized for delivery of the data packet. Thus, using the mapping array, the packet delivery sub-system 216 may transmit each data packet through a corresponding encrypted data stream 218 to the client device 202. In an embodiment, since the mapping array specifies an ordering for reassembly of the data packets and, for each data packet, a data stream identifier corresponding to an encrypted data stream through which the data packet is to be transmitted, the packet delivery sub-system 216 transmits the data packets in any order through the encrypted data streams 218.

In an embodiment, the client device 202, through a packet processing sub-system 220, obtains the encrypted data packets from the packet delivery sub-system 216 through the encrypted data streams 218. The packet processing sub-system 220 is implemented on the client device 202 using hardware and software and may be executed using executable instructions whose execution by the client device 202 causes the packet processing sub-system 220 to perform the operations described herein. The packet processing sub-system 220 may evaluate the encrypted data packets obtained via the encrypted data streams 218 to determine whether a requisite number of encrypted data packets have been received for reassembly of the data 208. For instance, if the data packets are generated by the packet generation module 210 in accordance with a redundancy schema, the packet processing sub-system 220 may determine whether it has received the minimum number of data packets required for reassembly of the data 208. If the minimum number of data packets has not been received, the packet processing sub-system 220 may determine whether additional encrypted data packets are being transmitted over the encrypted data streams 218. If so, the packet processing sub-system 220 may await delivery of these additional encrypted data packets to determine whether the minimum number of data packets required for reassembly of the data 208 has been received. In an embodiment, if the packet processing sub-system 220 determines that reassembly of the data 208 is not possible (e.g., insufficient data packets have been received and the VPN server 204 has reported delivery of all data packets, etc.), the packet processing sub-system rejects the received encrypted data packets. Alternatively, the packet processing sub-system 220 may evaluate the mapping array to identify the missing encrypted data packets and transmit a request to the VPN server 204 to obtain the missing encrypted data packets.

The packet processing sub-system 220 may transmit the obtained encrypted data packets and the mapping array to a packet decryption module 222 of the client device 202 for decryption of the encrypted data packets. The packet decryption module 222 is implemented on the client device 202 using hardware and software and may be executed using executable instructions whose execution by the client device 202 causes the packet decryption module 222 to perform the operations described herein. The packet decryption module 222 may, for each encrypted data packet, evaluate the mapping array to identify an identifier corresponding to a cryptographic key utilized to encrypt the encrypted data packet. The packet decryption module 222 may query a key repository 224 of the client device 202 to determine whether the cryptographic key identified in the mapping array is available for use. If the cryptographic key needed to decrypt the encrypted data packet is not available through the key repository 224, the packet decryption module 222 may reject the encrypted data packet and transmit a notification to the packet processing sub-system 220 to indicate that decryption of the encrypted data packet is not possible. This may cause the packet processing sub-system 220 to perform another analysis to determine whether reassembly of the data 208 is possible. This analysis may be similar to the analysis described above for determining whether a minimum number of data packets are available for reassembly of the data 208.

If the packet decryption module 222 is able to decrypt the obtained encrypted data packets, the packet decryption module 222 may provide the decrypted data packets to the packet processing sub-system 220 for further evaluation. For instance, the packet processing sub-system 220 may determine whether additional encrypted data packets have been obtained through the encrypted data streams 218 and, if so, determine whether a minimum number of data packets are available for reassembly of the data 208. If a minimum number of data packets have been obtained for reassembly of the data 208, the packet processing sub-system 220 may transmit the decrypted data packets to a data stream assembly module 226 of the client device 202 for reassembly of the data 208. The data stream assembly module 226 is implemented on the client device 202 using hardware and software and may be executed using executable instructions whose execution by the client device 202 causes the data stream assembly module 226 to perform the operations described herein.

The data stream assembly module 226 may evaluate the mapping array to identify the sequence for assembly of the data packets to obtain the data 208. The data stream assembly module 226 may assemble the data packets from the packet processing sub-system in accordance with the sequence specified in the mapping array. Further, the data stream assembly module 226 may evaluate the obtained data 208 to determine its integrity for delivery to users of the client device 202. If the data 208 is corrupted or is otherwise rendered unusable, the data stream assembly module 226 may transmit a notification to the VPN server 204 to indicate that the data 208 is unusable. This may cause the VPN server 204 to perform a diagnostic analysis of the various modules and sub-systems of the VPN server 204 to determine whether disassembly of the data 208 is creating the corruption. Based on the diagnostic analysis, the VPN server 204 may perform one or more remedial actions to prevent corruption of new data.

In an embodiment, cryptographic keys usable to encrypt and decrypt the data packets transmitted over the encrypted data streams 218 are subject to a rotation schedule and/or are subject to rotation in response to a triggering event. If the client device 202 or the VPN server 204 determines that a cryptographic key for a particular encrypted data stream is to be rotated, the client device 202 and the VPN server 204 may initiate a new handshake for the encrypted data stream to generate a new shared secret (e.g., cryptographic key) for use in encrypting data packets to be transmitted over the encrypted data stream. During the new handshake process for this encrypted data stream, the VPN server 204, through the packet generation module 210, may redirect data packets to other encrypted data streams by utilizing other cryptographic keys corresponding to these other encrypted data streams to encrypt the data packets. Further, the VPN server 204, through the packet generation module 210, may update the mapping array to indicate that these data packets are being transmitted over the other encrypted data streams. Thus, the packet processing sub-system 220 of the client device 202 may obtain the encrypted data packets over the other encrypted data streams and utilize the corresponding cryptographic keys to decrypt the encrypted data packets and order these data packets in accordance with the sequence ordinal for assembly of the data packets into the data 208.

If the VPN server 204 detects that rotation of the cryptographic key for an encrypted data stream has been completed, and the VPN server 204 and client device 202 have obtained and stored the shared secret (e.g., cryptographic key, etc.) corresponding to the encrypted data stream within their respective key repositories 214, 224, the VPN server 204 may resume transmission of a subset of the data packets using this encrypted data stream. The VPN server 204, through the packet generation module 210 and the encryption module 212, may utilize the new cryptographic key and initialization vectors/counters corresponding to a new range of values assigned to the encrypted data stream to encrypt data packets to be transmitted over the encrypted data stream. Further, the packet generation module 210 may update the mapping array and sequence ordering for the data packets to indicate which data packets are being transmitted over the encrypted data stream and the placement within the ordering of these data packets for reassembly of the data 208.

Figure 3:
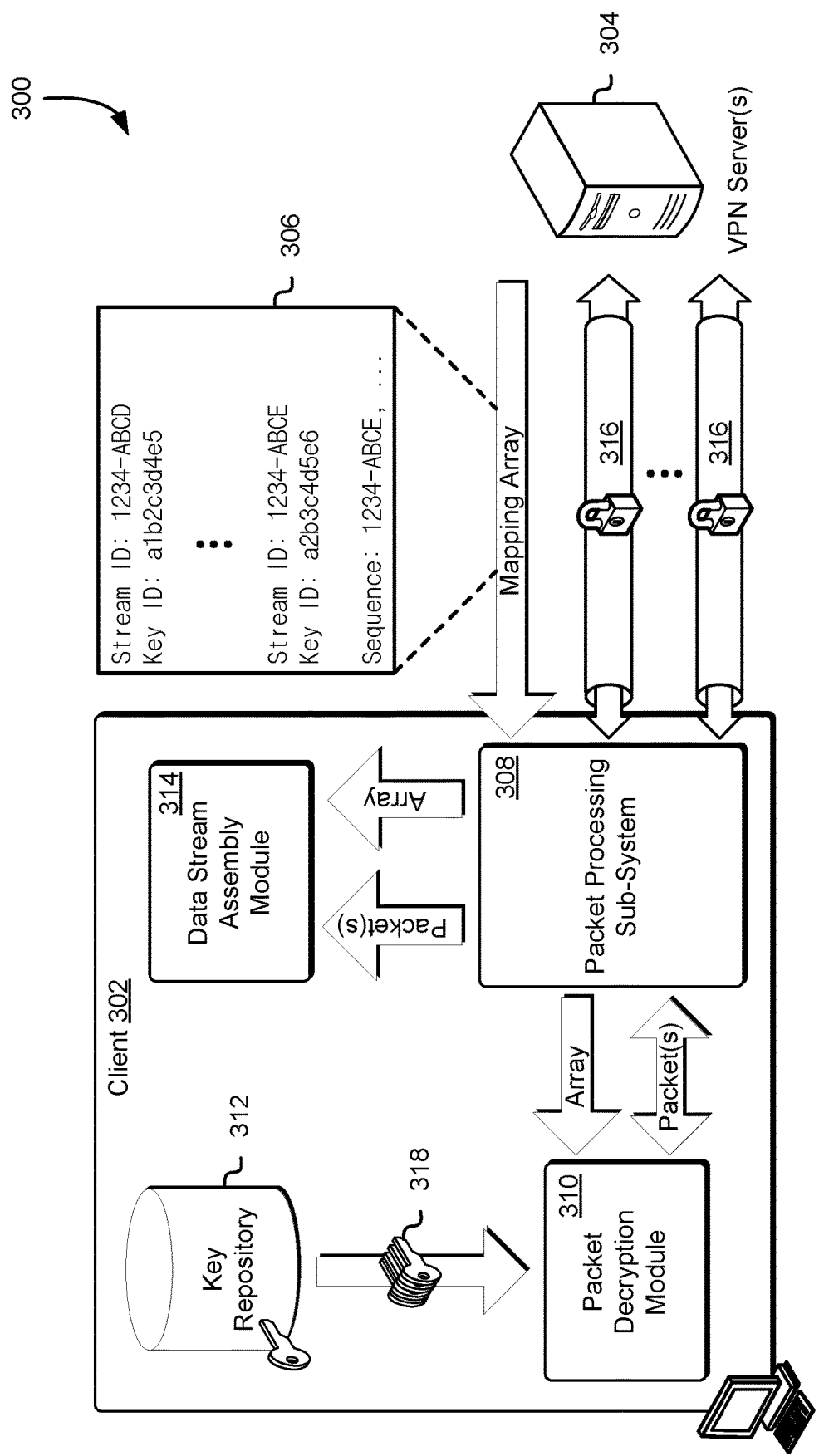
FIG. 3 shows an illustrative example of a system in which a client decrypts packets obtained from a VPN server through a set of parallel encrypted data streams for compilation of the packets in accordance with at least one embodiment.

FIG. 3 shows an illustrative example of a system 300 in which a client device 302 decrypts data packets obtained from a VPN server 304 through a set of parallel encrypted data streams 316 for compilation of the data packets in accordance with at least one embodiment. In the system 300, a packet processing sub-system 308 of the client device 302 receives a set of encrypted data packets from the VPN server 304 via a set of encrypted data streams 316. Each data packet transmitted over the encrypted data streams 316 may include a plaintext packet header. The plaintext packet header may specify an identifier of the cryptographic key utilized to encrypt the data packet, any initialization vector or counter used in the encryption of the data packet, and the placement of the data packet within the ordering of data packets for reassembly of the data. The VPN server 304 may also transmit to the client device 302 a mapping array 306. In an embodiment, the mapping array 306 specifies an ordering for assembly of the data packets to obtain the data. Further, the mapping array 306 may specify, for each data packet, an identifier corresponding to the encrypted data stream 316 utilized to transmit the data packet from the VPN server 304 to the packet processing sub-system 308 of the client device 302. The mapping array 306 may also specify, for each data packet, an identifier corresponding to the cryptographic key utilized to encrypt the data packet. This enables the packet processing sub-system 308 to evaluate the header of the data packet and the mapping array 306 to ensure that the identifier corresponding to the cryptographic key is the same within the header and the mapping array 306.

In an embodiment, the packet processing sub-system 308 of the client device 302 obtains the encrypted data packets from the VPN server 304 through the encrypted data streams 316. The packet processing sub-system 308 may evaluate the encrypted data packets obtained via the encrypted data streams 316 to determine whether a requisite number of encrypted data packets have been received for reassembly of the data. If the minimum number of data packets has not been received, the packet processing sub-system 308 may determine whether additional encrypted data packets are being transmitted over the encrypted data streams 316. If so, the packet processing sub-system 308 may await delivery of these additional encrypted data packets to determine whether the minimum number of data packets required for reassembly of the data has been received. In an embodiment, if the packet processing sub-system 308 determines that reassembly of the data is not possible, the packet processing sub-system 308 rejects the received encrypted data packets. Alternatively, the packet processing sub-system 308 may evaluate the mapping array 306 to identify the missing encrypted data packets and transmit a request to the VPN server 304 to obtain the missing encrypted data packets.

The packet processing sub-system 308 may transmit the obtained encrypted data packets and the mapping array 306 to a packet decryption module 310 for decryption of the encrypted data packets. The packet decryption module 310 may, for each encrypted data packet, evaluate the mapping array 306 to identify an identifier corresponding to a cryptographic key 318 utilized to encrypt the encrypted data packet. The packet decryption module 310 may query a key repository 312 to determine whether the cryptographic key 318 identified in the mapping array 306 is available for use. If the cryptographic key 318 needed to decrypt the encrypted data packet is not available through the key repository 312, the packet decryption module 310 may reject the encrypted data packet and transmit a notification to the packet processing sub-system 308 to indicate that decryption of the encrypted data packet is not possible. This may cause the packet processing sub-system 308 to perform another analysis to determine whether reassembly of the data is possible.

If the cryptographic keys 318 needed to decrypt the encrypted data packets are available through the key repository 312, the packet decryption module 310 may obtain the cryptographic keys 318 for decryption of the encrypted data packets. The packet decryption module 310 may decrypt these encrypted data packets and provide the decrypted data packets to the packet processing sub-system 308 for further evaluation. If a minimum number of data packets have been obtained for reassembly of the data, the packet processing sub-system 308 may transmit the decrypted data packets to a data stream assembly module 314 for reassembly of the data. The data stream assembly module 314 may evaluate the mapping array 306 to identify the sequence for assembly of the data packets to obtain the data. The data stream assembly module 314 may assemble the data packets from the packet processing sub-system 308 in accordance with the sequence specified in the mapping array 306.

Figure 4:
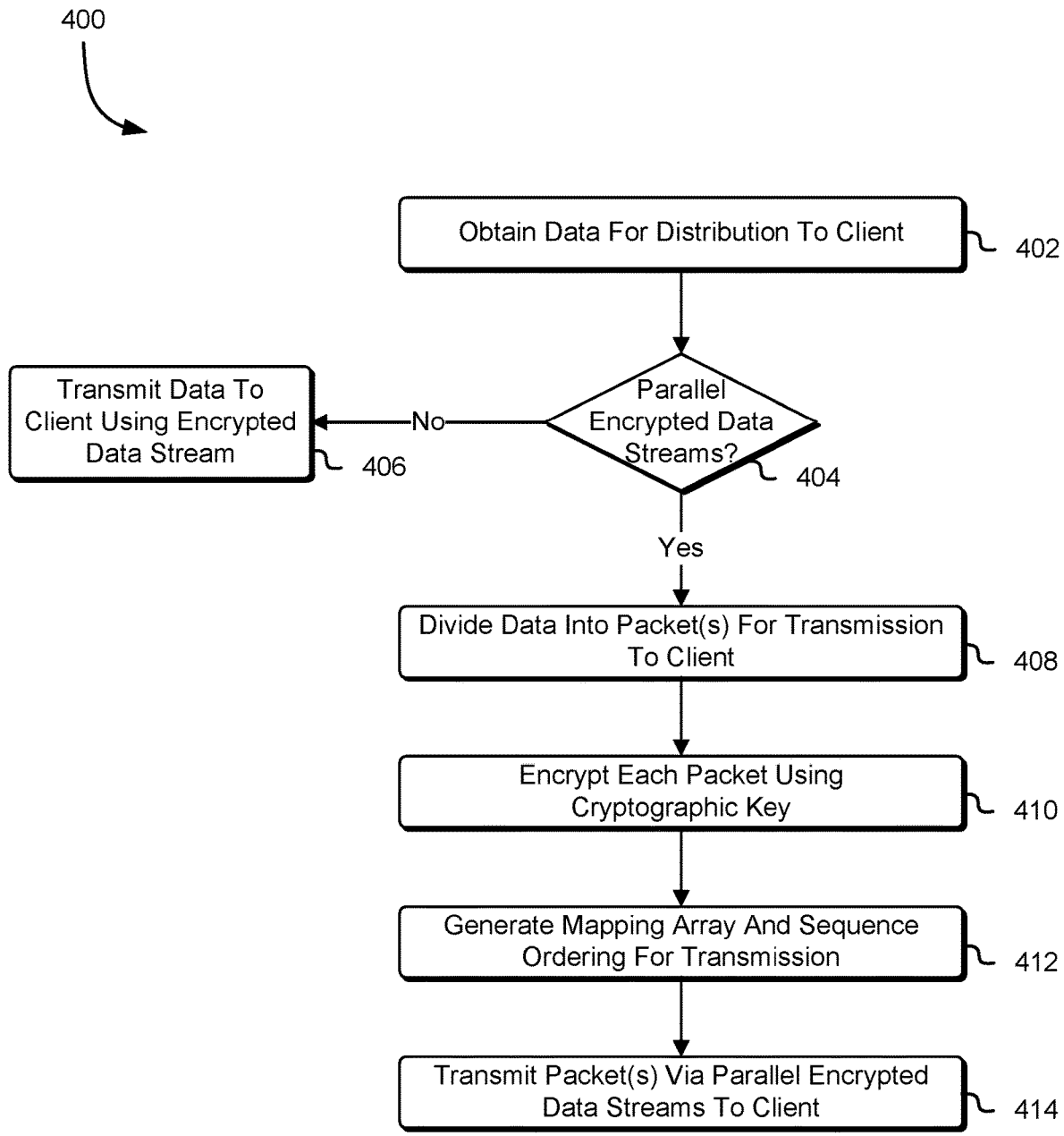
FIG. 4 shows an illustrative example of a process for encrypting and transmitting packets of data over a set of parallel encrypted data streams to a client in accordance with at least one embodiment.

As noted above, a VPN server may divide data obtained over a public communications network into data packets for delivery to a client device. These data packets may be encrypted using cryptographic keys or other encryption context corresponding to various encrypted data streams established between the VPN server and the client device. Further, the VPN server may provide a mapping array to the client device, which may specify an ordering in which the data packets are to be assembled to obtain the data, as well as identifiers corresponding to the cryptographic keys utilized to encrypt the data packets. Accordingly, FIG. 4 shows an illustrative example of a process 400 for encrypting and transmitting packets of data over a set of parallel encrypted data streams to a client in accordance with at least one embodiment. The process 400 may be performed by a VPN server that obtains data from a public communications network and provides data packets to a client device for reassembly of the data.

In an embodiment, the VPN server obtains 402 data for distribution to a client device. By default, data packets between the client device and the VPN server may be transmitted over a primary encrypted data stream. However, the client device may request that data packets for certain data be transmitted over multiple encrypted data streams instead of just the primary encrypted data stream. For instance, if the network bandwidth for the primary encrypted data stream is at or near capacity, the client device may request use of other encrypted data streams for delivery of data packets. In an embodiment, the client device obtains data from the network, through the VPN server, that provides an indication that multiple encrypted data streams be utilized for transmission of data packets from the VPN server to the client device. For instance, if a particular site accessible through the network indicates that multiple encrypted data streams may be used to reduce the latency in obtaining data via the site, the client device may transmit a request to the VPN server to establish or otherwise use the multiple encrypted data streams for use in transmitting the data packets from the VPN server to the client device. Thus, based on communication with the client device and the data being transmitted to the client device, the VPN server may determine 404 whether to utilize parallel encrypted data streams for transmission of the data packets to the client device.

If the VPN server determines that the data is to be provided to the client device over a primary encrypted data stream, the VPN server may divide the data into a plurality of data packets and transmits 406 these data packets to the client device over the primary encrypted data stream. For instance, the VPN server may determine the maximum payload size for each encrypted data stream and, based on this maximum payload size, divide the data into data packets having, at most, the maximum payload size. However, if the VPN server determines that the data packets are to be transmitted to the client device using a set of parallel encrypted data streams, the VPN server may divide 408 the data into data packets for transmission to the client device over this set of parallel encrypted data streams. For instance, the VPN server may identify a schema for dividing the data into a set of data packets for delivery to the client device over the myriad encrypted data streams between the VPN server and the client device. As an example, the VPN server may determine the available network bandwidth for each encrypted data stream. Based on the available network bandwidth for each of the encrypted data streams, the VPN server may determine how many data packets to generate from the data and the encrypted data streams that are to be used for each data packet.

In an embodiment, the VPN server determines which encrypted data stream is to be used for transmission of each data packet generated from the data. Based on this determination, the VPN server may identify, for each data packet, the cryptographic key and, if utilized, initialization vector and/or counter that may be used to encrypt the data packet. Thus, the VPN server may encrypt 410 each data packet using the corresponding cryptographic key and initialization vector or counter. Further, the VPN server, in an embodiment, generates 412 a mapping array that indicates, for each data packet, an identifier corresponding to the encrypted data stream utilized to transmit the data packet to the client device, a sequence ordering for the data packets and the corresponding placement within the sequence for the data packet, the initialization vector or counter (if used) utilized to encrypt the data packet, an identifier corresponding to the cryptographic key utilized, and the like. In an embodiment, each data packet is transmitted over an encrypted data stream with a packet header that specifies the cryptographic key utilized to encrypt the data packet, any initialization vector or counter used in the encryption of the data packet, and the placement of the data packet within the ordering of data packets for reassembly of the data.

The VPN server may transmit 414 the data packets to the client device via the parallel encrypted data streams in accordance with the association of each data packet with a corresponding encrypted data stream. For instance, as described above, a packet delivery sub-system of the VPN server may evaluate the mapping array to determine which encrypted data stream is to be utilized for delivery of each data packet to the client device. Using the mapping array, the packet delivery sub-system may transmit each data packet through a corresponding encrypted data stream to the client device. In an embodiment, since the mapping array specifies an ordering for reassembly of the data packets and, for each data packet, a data stream identifier corresponding to an encrypted data stream through which the data packet is to be transmitted, the packet delivery sub-system transmits the data packets in any order through the encrypted data streams.

Figure 5:
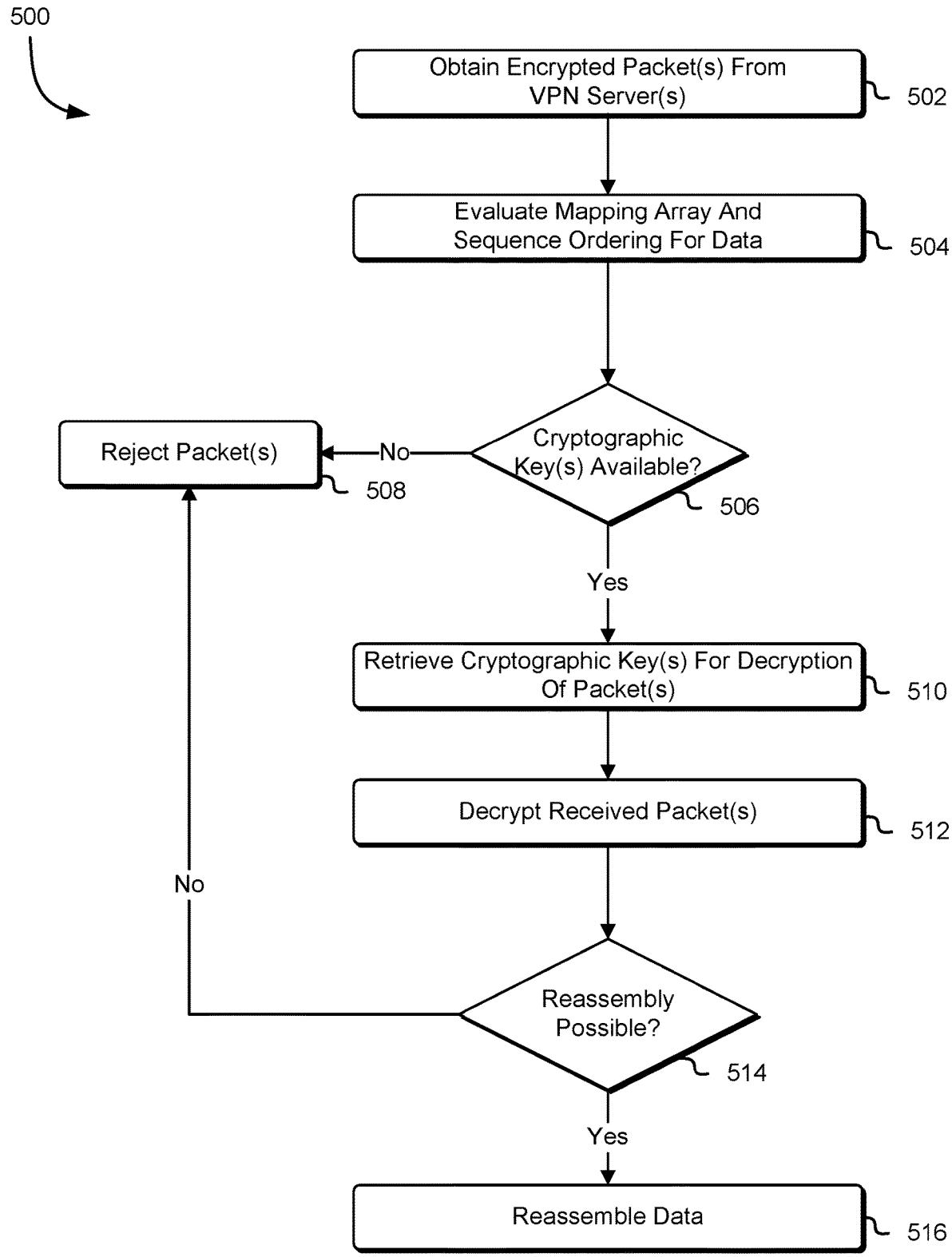
FIG. 5 shows an illustrative example of a process for decrypting a set of encrypted data packets obtained through parallel encrypted data streams in order to reassemble the data in accordance with at least one embodiment.

As noted above, a client device may receive data packets over a set of encrypted data streams. Each of these data packets may be encrypted using a cryptographic key corresponding to the encrypted data stream through which the data packet was transmitted. The client device may utilize the mapping array to identify the cryptographic key utilized to encrypt a data packet and to determine the placement of the data packet within a sequence ordering of the data packets for reassembly of the data. Accordingly, FIG. 5 shows an illustrative example of a process 500 for decrypting a set of encrypted data packets obtained through parallel encrypted data streams in order to reassemble the data in accordance with at least one embodiment. The process 500 may be performed by the aforementioned client device, which may obtain the data packets over the parallel encrypted data streams, decrypt these data packets in accordance with a mapping array that provides a mapping of cryptographic keys to data packets, and reassembles the decrypted data packets to obtain the data.

In an embodiment, the client device obtains 502 the encrypted data packets from a packet delivery sub-system of a VPN server through a set of encrypted data streams. The client device may evaluate 504 the encrypted data packets obtained via the encrypted data streams and a mapping array that specifies a sequence ordering for the data packets and identifiers corresponding to cryptographic keys utilized to encrypt the data packets. For instance, the mapping array may include an entry corresponding to each data packet that may be utilized to reassemble the data. Each entry may specify an identifier corresponding to the encrypted data stream through which the data packet is transmitted, an identifier corresponding to the cryptographic key utilized to encrypt the data packet, and a sequence ordering identifier that may correspond to the placement of the data stream within the sequence ordering of the data packets for reassembly of the data.

The client device may, for each encrypted data packet, evaluate the mapping array to identify an identifier corresponding to a cryptographic key utilized to encrypt the encrypted data packet. The client device may query a key repository of the client device to determine 506 whether the cryptographic key identified in the mapping array is available for use. If the cryptographic key needed to decrypt the encrypted data packet is not available through the key repository, the client device may reject 508 the encrypted data packet. However, if the client device determines that the cryptographic keys are available for decryption of the encrypted data packets, the client device may retrieve 510 the cryptographic keys from the key repository of the client device and decrypt 512 the data packets using these cryptographic keys.

In an embodiment, the client device determines 514 whether reassembly of the data is possible with the decrypted data objects and any other encrypted data objects that are in the process of being transmitted to the client device. For instance, in addition to evaluating the decrypted data packets, the client device may determine whether additional encrypted data packets have been obtained through the encrypted data streams and, if so, determine whether a minimum number of data packets are available for reassembly of the data. If a minimum number of data packets have been obtained for reassembly of the data, the client device may evaluate the mapping array to identify the sequence for assembly of the data packets to obtain the data. The client device may reassemble 516 the data packets in accordance with the sequence specified in the mapping array. Further, the client device may evaluate the obtained data to determine its integrity for delivery to users of the client device.

However, if reassembly of the data is not possible, the client device may reject 508 the data packets. As noted above, a VPN server may use a redundancy scheme to provide a level of redundancy to the data packets to be transmitted over the parallel encrypted data streams. The VPN server may use M-out-of-N redundancy or other parallel redundancy scheme for transmission of the data packets to the client device over the parallel encrypted data streams. The determination of the number of data packets to generate, whereby a smaller number of data packets is required for reassembly of the data, may be performed based on a rate of data packet loss over any of the encrypted data streams. Thus, the VPN server may utilize a redundancy encoding scheme such as erasure coding to deconstruct the data into multiple data packets that can be transmitted over the encrypted data streams. The client device may, thus, determine whether the minimum number of data packets is available for reassembly of the data. If there are insufficient data packets for reassembly of the data, the client device may reject 508 the data packets, as it would be unable to reassemble the data.

Figure 6:
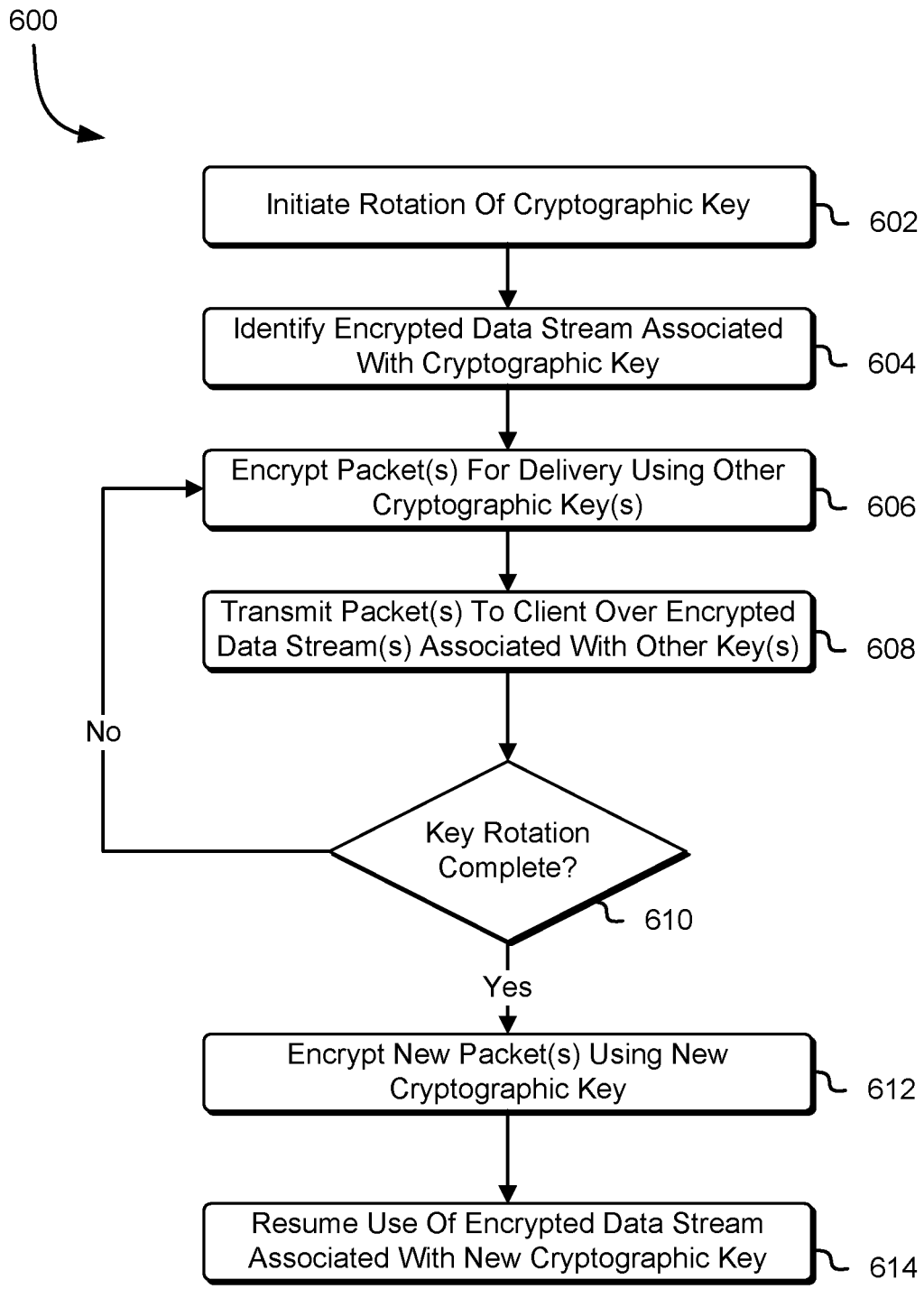
FIG. 6 shows an illustrative example of a process for rotating cryptographic keys associated with parallel encrypted data streams in accordance with at least one embodiment.

As noted above, the client and/or VPN server may determine that rotation of a cryptographic key for a particular encrypted data stream is required. This determination may be made in response to a triggering event (e.g., cryptographic key has been compromised, request to establish a new handshake, etc.) or to a determination that a cryptographic key is set to expire, requiring rotation of the cryptographic key. The encrypted data stream corresponding to the cryptographic key may be inoperable during the cryptographic key rotation. This may cause the VPN server to encrypt data packets utilizing other cryptographic keys and, accordingly, transmit these data packets to the client device over other encrypted data streams. Accordingly, FIG. 6 shows an illustrative example of a process 600 for rotating cryptographic keys associated with parallel encrypted data streams in accordance with at least one embodiment. The process 600 may be performed by a VPN server, which may determine whether rotation of a cryptographic key of an encrypted data stream is required.

If either the client device or the VPN server determine that a new handshake for a particular encrypted data stream is required, the VPN server may initiate 602 rotation of the cryptographic key associated with the encrypted data stream. Alternatively, if the client device or VPN server determines that a particular cryptographic key has been compromised, is about to expire, etc., the VPN server may initiate 602 rotation of this particular cryptographic key and identify 604 the encrypted data stream associated with this cryptographic key. Rotation of the cryptographic key may require rendering the associated encrypted data stream inoperable until a new cryptographic key has been generated that can be used to encrypt data packets that are to be transmitted over the encrypted data stream. This may include performing a new handshake process between the client device and the VPN server to re-establish this encrypted data stream.

During the cryptographic key rotation process, the VPN server may encrypt 606 any data packets for delivery to the client device using other cryptographic keys and, hence, other encrypted data streams, as each cryptographic key may be associated with a particular encrypted data stream. The VPN server may redirect data packets to other encrypted data streams by utilizing other cryptographic keys corresponding to these other encrypted data streams to encrypt the data packets. Further, the VPN server may update the mapping array to indicate that these data packets are being transmitted over the other encrypted data streams. Thus, the VPN server may transmit 608 the encrypted data packets over the other encrypted data streams associated with these other cryptographic keys. The client device may obtain the encrypted data packets over the other encrypted data streams and utilize the corresponding cryptographic keys and (if utilized) initialization vectors or counters to decrypt the encrypted data packets and order these data packets in accordance with the sequence ordinal for assembly of the data packets into the data.

The VPN server may monitor the cryptographic key rotation process to determine 610 whether rotation of the cryptographic key has been completed. For instance, the VPN server may determine whether a new cryptographic key has been generated and, if so, whether this new cryptographic key has been associated with the encrypted data stream. Alternatively, the VPN server may determine whether the handshake process for re-establishing the encrypted data stream has been completed. If the cryptographic key rotation process has not been completed, the VPN server may continue to encrypt 606 any data packets for delivery to the client device using the other cryptographic keys to enable delivery of these data packets via the other encrypted data streams.

If rotation of the cryptographic key is completed, the VPN server 204 may utilize the new cryptographic key and initialization vectors/counters corresponding to a new range of values assigned to the encrypted data stream to encrypt 612 data packets to be transmitted over the encrypted data stream. Further, the VPN server may update the mapping array and sequence ordering for the data packets to indicate which data packets are being transmitted over the encrypted data stream and the placement within the ordering of these data packets for reassembly of the data. This enables the VPN server to resume 614 use of the encrypted data stream associated with the new cryptographic key to transmit encrypted data packets to the client device.

Figure 7:
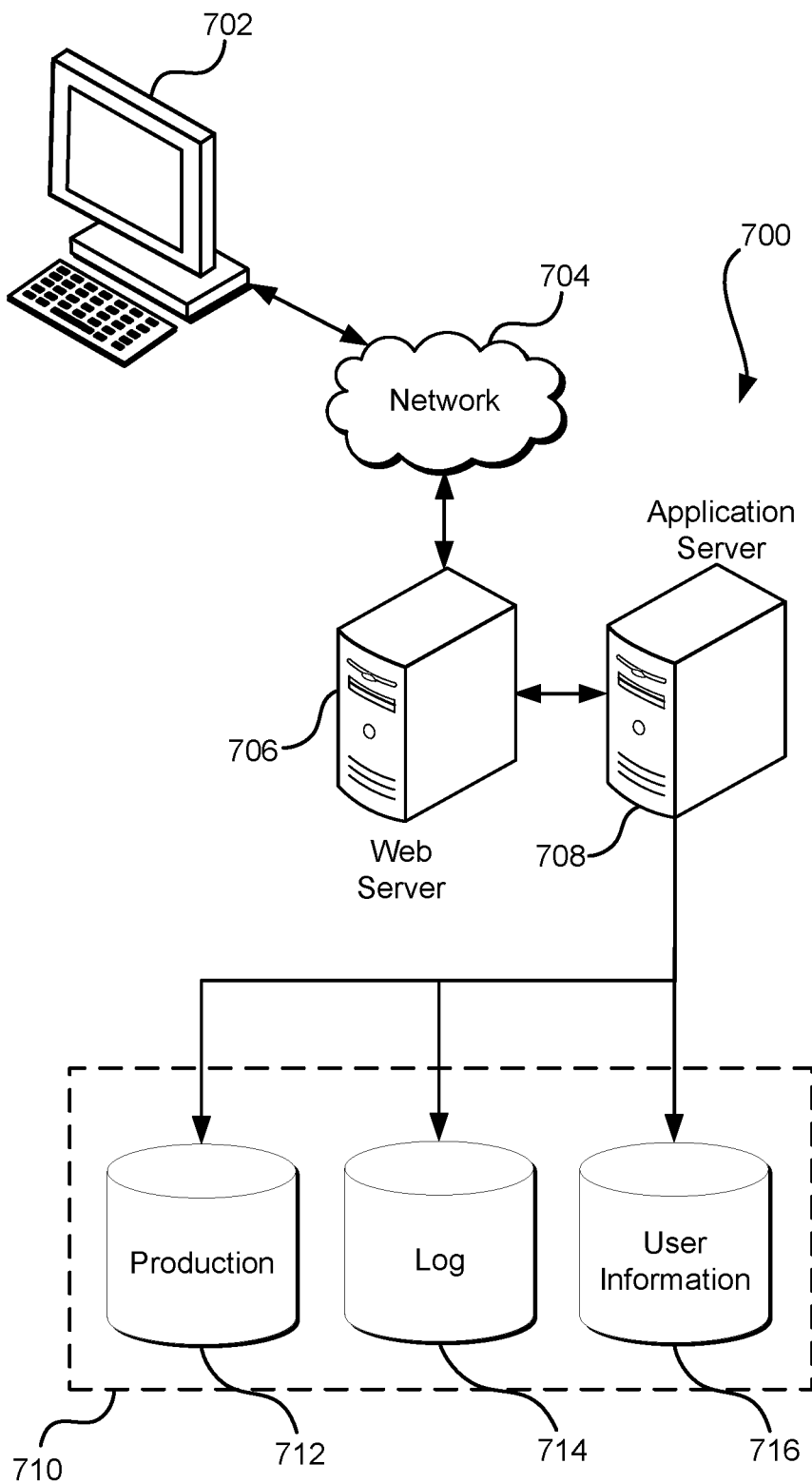
FIG. 7 shows an illustrative example of a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art. In an embodiment, the electronic client device 702 communicates with the web server 706 via one or more encrypted data streams in accordance with the techniques described above. The electronic client device 702 and the web server 706 may be part of the VPN, whereby encrypted data packets are transmitted over the encrypted data streams through the network 704.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining data for delivery to a client device;
   selecting a first data stream from a plurality of data streams of a single virtual private network connection with the client device, each data stream of the plurality of data streams associated with an encryption context different from other data streams, wherein the encryption context includes a set of parameters used as inputs to define encryption and decryption, and wherein selection of a data stream is disabled during a change to an encryption context of the data stream;
   selecting a second data stream from the plurality of data streams;
   generating a data packet based on the data such that the data packet is encrypted specific to the first data stream and comprises information that indicates the first data stream and a relationship of data in the data packet relative to at least one other data packet sent via the second data stream;

providing, via the single virtual private network connection, a mapping comprising an order of assembly of the data packet and the at least one other data packet; and providing the generated data packet to the client device via the first data stream.

2. The computer-implemented method of claim 1, wherein the relationship of the data in the data packet relative to the at least one other data packet is an identifier specifying a sequence position in the order of assembly for reassembling the data for delivery to the client device.

3. The computer-implemented method of claim 1, further comprising:
  initiating a change to an encryption context of a data stream of the plurality of data streams;
  selecting a different data stream from the plurality of data streams;
  generating a second data packet based on the data such that the second data packet is encrypted to the different data stream;
  determining that the change to the encryption context of the data stream has been completed; and
  enabling selection of the data stream for providing data packets to the client device.

4. The computer-implemented method of claim 1, wherein the plurality of data streams are established based on a number of cores of a central processing unit of the client device.

5. A system, comprising:
  one or more processors; and
  memory comprising computer-executable instructions that, if executed by the one or more processors, cause the system to:
    generate a data packet, wherein the data packet is encrypted using a set of encryption parameters specific to a first data stream of a plurality of data streams of a single virtual private network connection, and wherein selection of the first data stream is deactivated during rotation of the set of encryption parameters;
    provide a mapping over the single virtual private network connection, the mapping comprising information that indicates an order of assembly of the data packet and another data packet provided via a second data stream of the plurality of data streams; and
    provide the data packet via the first data stream.

6. The system of claim 5, wherein the execution of the computer-executable instructions further cause the system to:
  obtain data and an indication that the data is to be provided using the plurality of data streams; and
  determine distribution of data packets over each data stream of the plurality of data streams, the data packets generated from the data.

7. The system of claim 5, wherein:
  the data packet comprises an identifier corresponding to a placement of the data packet within the order of assembly; and
  the identifier and the order of assembly are usable for reassembly of divided data from the plurality of data streams using the data packet received in any order relative to the other data packet.

8. The system of claim 5, wherein the mapping specifies a second identifier corresponding to placement of the data packet in a redundancy encoding scheme for reassembly of data using the data packet.

9. The system of claim 5, wherein the mapping specifies, for a corresponding each data packet of a set of data packets, a third identifier of a cryptographic key usable for decryption of the corresponding each data packet of the set of data packets.

10. The system of claim 5, wherein the data packet is encrypted using a cryptographic key specific to the first data stream.

11. The system of claim 5, wherein the first data stream and the second data stream comprise different encryption contexts for encrypting data streams.

12. The system of claim 5, wherein the execution of the computer-executable instructions further cause the system to:
  determine that an encryption context of the first data stream is set to expire;
  initiate a rotation of the encryption context to obtain a new encryption context;
  provide data packets using other data streams of the plurality of data streams;
  determine completion of the rotation of the encryption context resulting in the new encryption context being implemented for the first data stream; and
  resume use of the first data stream.

13. A non-transitory computer-readable storage medium comprising executable instructions that, as a result of being executed by one or more processors of a computer system, cause the computer system to at least:
  obtain a first packet via a first data stream of a plurality of data streams of a single virtual private network connection;
  decrypt the first packet based on an encryption context specific to the first data stream, wherein the encryption context includes a set of parameters used as inputs to define encryption and decryption, and wherein transmission via the first data stream is disabled during rotation of the encryption context; and
  combine, via the single virtual private network connection, data from the first packet with data from a second packet in an order indicated by a mapping array, wherein the second packet was obtained out-of-order from the first packet via a second data stream.

14. The non-transitory computer-readable storage medium of claim 13, wherein the instructions further cause the computer system to:
  determine whether a minimum number of packets has been obtained to enable combination of a set of data; and
  as a result of receipt of the minimum number of packets, combine data from the minimum number of packets.

15. The non-transitory computer-readable storage medium of claim 13, wherein:
  information in the first packet specifies an identifier usable to determine a placement of the first packet in the order indicated by the mapping array; and
  the instructions further cause the computer system to utilize the identifier to determine the placement of the first packet in the order to enable combination of the data from the first packet with the data from the second packet in accordance with the mapping array.

16. The non-transitory computer-readable storage medium of claim 13, wherein the instructions further cause the computer system to:
  establish, with a server, the plurality of data streams of the virtual private network connection; and
  provide a request to the server to provide the first packet and the second packet over different data streams of the plurality of data streams.

17. The non-transitory computer-readable storage medium of claim 13, wherein the encryption context includes a cryptographic key and a counter value, the cryptographic key and the counter value usable as input for decryption of the first packet.

18. The non-transitory computer-readable storage medium of claim 13, wherein the instructions further cause the computer system to:
- obtain the second packet from a second data stream, the second data stream comprising a second encryption context different from the encryption context specific to the first data stream; and
- decrypt the second packet based on the second encryption context.

19. The non-transitory computer-readable storage medium of claim 13, wherein the instructions further cause the computer system to:
- obtain an indication that data is to be provided using the plurality of data streams; and
- provide a request to a server of the single virtual private network connection to provide data packets corresponding to the data over the plurality of data streams.

20. The non-transitory computer-readable storage medium of claim 13, wherein the plurality of data streams are established based on a number of cores of a central processing unit of a server connected to the computer system via the single virtual private network connection.

* * * * *